May 17, 1966     D. E. TILL ETAL     3,251,475

FIBROUS FILTER BODY

Original Filed April 18, 1955     2 Sheets-Sheet 1

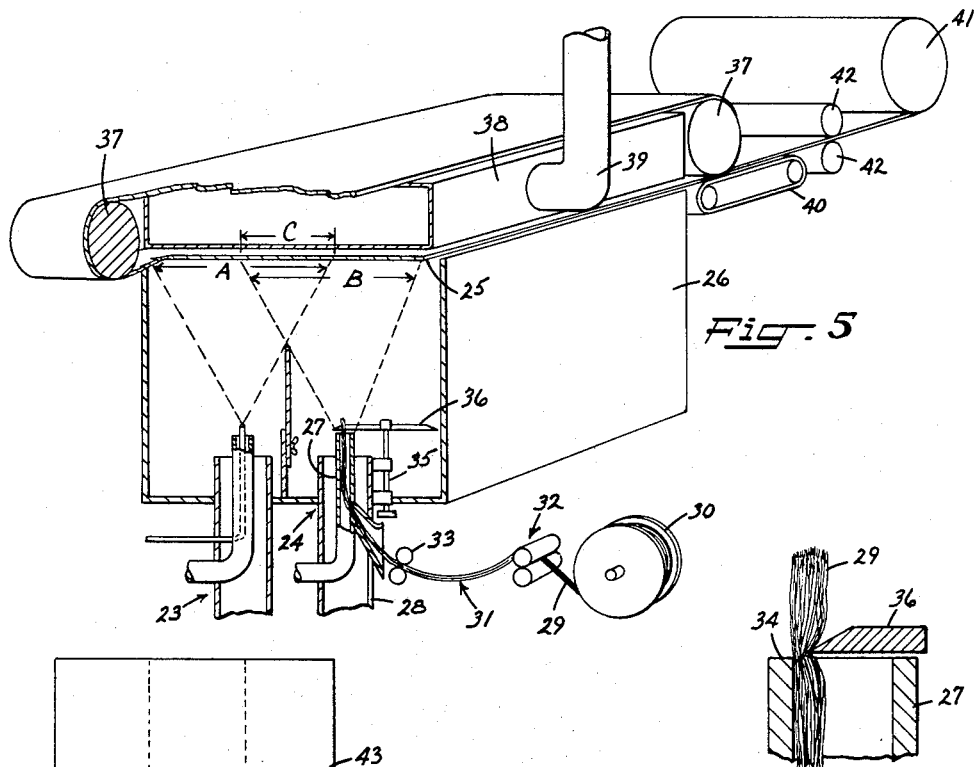

United States Patent Office 3,251,475
Patented May 17, 1966

3,251,475
FIBROUS FILTER BODY
Derek E. Till, Concord, Mass., and Worth Wade, Rosemont, Pa., assignors, by mesne assignments, to FMC Corporation, San Jose, Calif., a corporation of Delaware
Original application Apr. 18, 1955, Ser. No. 501,933, now Patent No. 3,073,735, dated Jan. 15, 1963. Divided and this application June 1, 1962, Ser. No. 238,312
4 Claims. (Cl. 210—508)

This application is a division of application Serial No. 501,933, filed April 18, 1955, now Patent No. 3,073,735.

This invention relates in general to filters and in particular to a process and apparatus for producing filters which vary in properties along a dimension and to the filters so produced.

In the filtration of fluids such as oils, water and gases, the use of the conventional fibrous filters made of a mass of uniform fibers arranged in a uniform manner results in many disadvantages. Since the filter is uniform in properties in the direction of fluid flow, the particles or materials which are to be removed from the stream of fluid impinging on the filter behave in the following manner: first, the large particles lodge on the surface or in the superficial surface layers of the filter and tend to close up the interstices on that surface thereby reducing the size of the interstices, then the "closed" surface arrests progressively the particles of diminishing size until the interstices on the filter surface are reduced to such small size that even the finest particles are arrested at the surface. The closing up of the front surface areas of the filter causes a build-up of an excessive back pressure within an undesirably short period of time. In many applications, it is necessary to employ a "prefilter" of coarse material in order to remove large particles in an attempt to prolong the useful period of the filter.

Therefore, it is a general object of the present invention to provide a filter which will prevent the build-up on the front surface of a large deposit of particles from the fluid stream being filtered and extend or prolong the time required for the back pressure to reach a critical value.

It is a specific object of the invention to provide a filter for moving streams of liquid or gas which will result in filtration in depth, that is, the large particles only will be arrested in the front surface areas and the particles of decreasing diameter will be arrested progressively at progressively greater depths within the filter to avoid the rapid build-up of high back pressures.

It is another object of the invention to provide a process for the construction of fibrous filters showing variable filtration characteristics along a dimension.

A further object of the invention is to provide an apparatus for forming filters in which the fibers therein vary in properties along a dimension of the filter and which will exhibit filtration in depth and avoid high back pressures.

Other objects of the invention will be obvious or will appear from the disclosure hereinafter set forth.

According to the present invention, a filter exhibiting filtration in depth is made by producing fibers from a plumrality of fiber-forming means, the fibers of each means differing in physical characteristics from those of the other means, suspending the fibers in a gas stream and depositing the fibers from the gas stream on a surface in such intermingled relationship that there is a gradual gradation in fiber property along one dimension of the filter.

The apparatus of the invention comprises the combination of a chamber having a moving collecting surface at one end, such as an endless porous screen, fiber distributing means in spaced relationship at the opposite end of the chamber and means for conveying fibers from the distributing means to the collector in a gas stream and depositing the fibers on the collector in random distribution in the form of a web, the fibers in the web differing in physical characteristics along one dimension of the web.

For a more complete understanding of the nature and objects of the invention, reference should be had to the accompanying drawings, in which FIGURE 1 is a diagramamtical representation in side elevation of one embodiment of the apparatus of the invention;

FIGURE 5 is a perspective view, partly in section, of another embodiment of the apparatus of the invention;

FIGURE 6 is a cross-section of a detail of the fiber cutting device utilized in the apparatus of FIGURE 5;

FIGURE 7 is a cross-sectional view of a further form of fiber-forming means for use in the apparatus of this invention;

FIGURE 8 is a top plan view of the web produced in the apparatus of FIGURE 5 showing one step in the preparation of a rolled filter therefrom;

FIGURE 9 is a perspective view of the partially rolled filter of the invention; and FIGURE 10 is a perspective view, partly in section, of a rolled filter in accordance with one embodiment of the invention.

Figure 1:
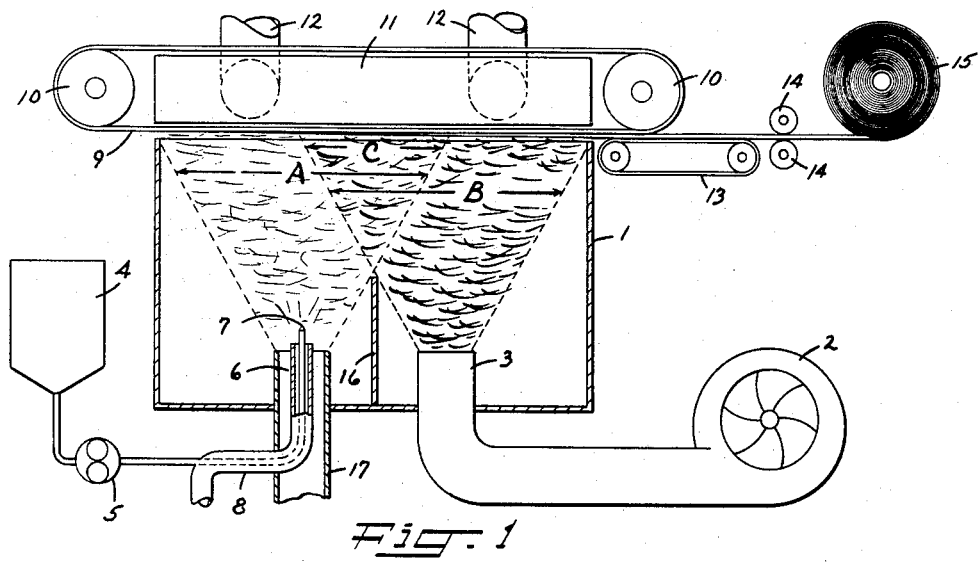

One embodiment of the apparatus is shown in FIGURE 1 in which there is provided a chamber 1 having means for introducing fibers of different characteristics therein. For example, one of the fibers may be preformed, such as staple textile fibers, and may be introduced at the bottom of the chamber by means of the blower 2 and duct 3. The other fiber may be produced in situ by feeding a plastic fiber-forming composition from the reservoir 4 by means of the pump 5 to the spraying unit 6 which comprises a spraying liquid tube 7 positioned in the center of a nozzle 8 through which air is forced at a high velocity. The fibers from both units rise in the gas streams and are deposited in random distribution on the perforated endless screen 9 which is moved across the top of the chamber by the driving rolls 10. The web of fibers is held on the screen by means of suction created by the suction box 11 and the exhaust ducts 12. The web may be removed from the screen continuously by means of the small belt 13, then passed between the pressure rolls 14 and collected on the take-up roll 15. The fiber-forming units or the fiber distributing means are separated by a partition 16, the height of which is adjustable. The partition may be omitted when it is not desired to confine the different fibers into well defined layers. It is understood, however, that in the absence of the partition the product will show a gradual variation in fiber diameter or character through the thickness of the web where the fiber distributing means are spaced apart as shown and the collecting screen first passes through a zone in which only fibers from the spraying unit 6 are deposited, then passes through a zone in which a mixture of the fibers is deposited and finally passes through a zone where only fibers from the distributing means 3 are deposited.

The fiber-forming unit 6 produces extremely fine fibers having a diameter of from 0.5 micron to about 10 microns in accordance with the process described and claimed in the copending application of Paul C. Watson, Serial No. 400,239, filed December 24, 1953, abandoned in favor of Serial No. 861,415, now Patent No. 2,988,469, dated June 13, 1961, whereas, the fiber distributing unit 12 may be employed for introducing rayon or other textile fibers having diameters from 10 microns and greater.

It should be noted that the two fiber units 6 and 3 are spaced from each other in a line in the direction of travel of the collecting screen 9 and they are also spaced from the screen by such a distance that the fibers from the unit 6 are deposited on the screen within the area A, while the fibers from the unit 3 are deposited on the screen within the area B, the two areas overlapping so that a mixture of the two different fibers is deposited within the area C. These areas, A, B and C may be of the same length or they may be different in length by varying the distance of the units 6 and 3 from the screen and from each other and also by varying the height of the adjustable separator partition 16.

Figure 2:
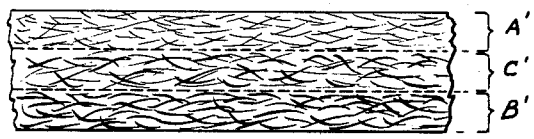
FIGURE 2 is a cross-sectional view of one embodiment of the article of the invention.

The product produced by use of the apparatus of FIGURE 1 is shown in FIGURE 2. In the specific relationship of the fiber distributing units and relative motion of the collector screen as illustrated in FIGURE 1, the fiber-forming unit 6 deposits fine fibers in the initial layers on the collector screen 9 so that they predominate in the top layer or strata $A^1$ while the unit 3 deposits coarse fibers to form the bottom layer or strata $B^1$ and the mixture of coarse and fine fibers are intermingled and mixed in the intermediate strata $C^1$ of the product. Thus, in the web shown in FIGURE 2, the average fiber diameter in the stratas varies and increase progressively from the top to the bottom of the layer. If this product is used as a filter so positioned that the stream to be filtered impinges first on the strata $B^1$, the larger particles will be selectively retained by the layer $B^1$, the medium-sized particles and the fine particles passing freely through this surface layer. In the middle strata $C^1$ the medium-sized particles will be arrested and the finer particles will pass on and be retained by the fine fiber layer $A^1$ on the other side of the filter. Thus, filtration in depth has been attained without clogging of the front surface of the filter and without generation of high back pressures.

Figures 3, 4:
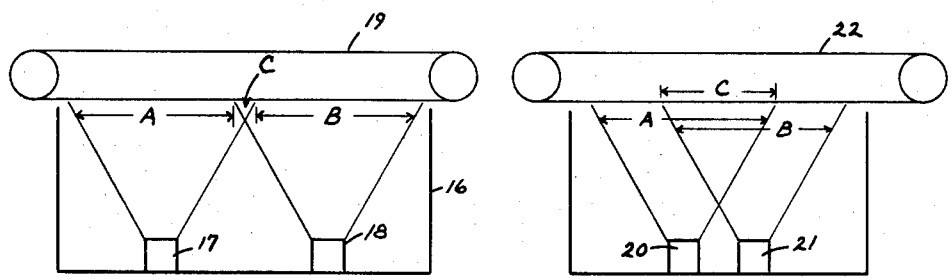
FIGURE 3 is a diagrammatical representation in side elevation of a filter-forming chamber having the fiber distributing means spaced according to a second embodiment of the invention.
FIGURE 4 is a diagrammatical representation in side elevation of a third embodiment of the invention.

It is to be understood that the fiber distribtuion pattern may be varied within wide limits. For example, in FIGURE 3, there is shown diagrammatically an arrangement in a chamber 16 in which the fiber distributing units 17 and 18 are spaced apart by such a distance that the area in which the deposited fibers overlap, area C on screen 19 is very narrow. In this case, the product has well defined layers of fine fibers and coarse fibers. On the other hand, in the embodiment shown diagrammatically in FIGURE 4, the fiber distributing units 20 and 21 are spaced close together so that the deposits of fibers overlap the major portion of the collecting surface on the screen 22. In this relationship, there is formed a product having relatively thin surface layers restricted to the respective fibers, the major portion of the body of the product comprising a blend of the two fibers.

The invention also contemplates products wherein the fiber properties vary from the inside to the outside instead of in depth. In that embodiment of the apparatus shown in FIGURE 5, the different fiber-forming units 23 and 24 are positioned in spaced relationship transverse to the direction of travel of the collecting screen 25 within the chamber 26. The fiber-forming unit 23 is of the type shown at 6 of FIGURE 1. The unit 24 comprises a high speed air duct 27 for introducing preformed fibers into the chamber which are of relatively large diameter as compared to fine fibers produced by the unit 23.

The fiber distributing unit 24 comprises a small diameter tube 27 through which a primary high velocity gas stream is forced by means of a suitable compressor or blower, not shown. This tube may be positioned inside a larger tube 28 through which low pressure gas is introduced as a secondary gas stream, but the use of a secondary stream is optional since the primary stream is ordinarily sufficient to convey the fibers to the collector 25. The fibers are cut "in situ" by feeding a multifilament tow or strand 29 from the package 30 into a relaxed loop 31 between the feed rollers 32 and 33 into the air tube 27. The high speed air stream causes the tow or strand to pass upward through the tube 27 and extend above its upper end 34. A cutter 35 having rotatable blades 36 is positioned, as shown in FIGURE 6, so that the blades 36 cut the bundle of fibers against the upper edge 34 of the tube 27. The cut bundle is then dispersed in the air stream and the fibers become immediately airborne and deposit on the collector screen 25.

The two units 23 and 24 are spaced from the porous collecting screen 25 by a distance such that the fine fibers are deposited over the area A, the coarser fibers in the area C. Of course, there are no well defined boundaries between the areas A and B so that there is a gradual transition and the average fiber diameter varies from small to large as one moves from left to right transversely across the screen. At the left-hand side, the average fiber diameter is that of the fine fibers. As the area C is approached, the average fiber diameter increases because some of the coarse fibers will deviate from the lines as shown in the drawing. In the center portion, the average fiber diameter may approach the average of the diameters of the fine and coarse fibers. As the right-hand side is approached, the average will increase because some of the fine fibers deviate from the lines as shown. At the right-hand side, the average fiber diameter is that of the coarser fibers.

The screen 25 is in the form an an endless porous belt passing around the spaced rollers 37 and between the courses of the screen there is positioned a suction box 38 having an exhaust duct 39 to drawn the fibers against the lower surface of the screen. The fiber layer is taken off the collecting screen 25 by a secondary belt conveyor 40 and collected on take-up roll 41. If desired, before collecting the web it may be passed between heated pressure rolls 42 to render tacky any thermoplastic fibers present in the fibrous layer so as to bind fibers in the product.

The web produced by use of the apparatus shown in FIGURE 5 is shown in FIGURE 8 in which the web or mat 43 comprises fine fiber area A, coarse fiber areas B and an intermediate area C in which the mixture of fibers provides a transition from the coarse to the fine fibers. As described hereinbefore, the boundaries are not sharp but have been so shown merely for purposes of illustration. The web 43 is then cut transversely into separate strips 44 which are rolled upon themselves to form a cylindrical filter as shown in FIGURES 9 and 10. For example, if the strip 44 is rolled from the right edge 45 toward the left edge 46 as shown in FIGURE 9, then the innermost strata 47 of the coiled filter will comprise coarse fibers, the filter layers gradually increasing in average fiber diameter toward the outer surface layers 49 where fine fibers will predominate as in FIGURE 8. It is possible, when desired, to coil the strips 44 from left to right to produce a product in which the fine fibers are on the inside (49) and the coarser fibers on the outside (47), as shown in FIGURE 10. The filter roll shown in FIGURE 9 is particularly useful where the fluid to be filtered is supplied to the central foraminous core 50 and the fluid flows through from the center outwardly and the filtered fluid is taken away from the outside. The filter roll shown in FIGURE 10, on the other hand, is particularly useful for the filtration of air or liquids which are applied to the filter from the outside so that the filtered fluid will be drawn out of the filter through the foraminous central core 50.

Alternative fiber-forming means of the type disclosed and claimed in the copending application of Richard P. Foster and Derek E. Till, Serial No. 501,932, filed April 18, 1955, now abandoned, may be utilized in place of the fiber-forming units 6 and 23 shown in FIGURES 1 and 5. The fiber-forming means includes a circular disc 51 having an upwardly-extending, integral rim or flange 52. A cover plate 53 is secured to the flange 52 to provide a closed chamber 54. A plurality of spaced, radially extending spray nozzles 55 are mounted on the periphery of the rim 52 and communicate with the chamber. An impeller comprising a plurality of gas-moving vanes 56 is secured to the lower side of the disc. The unit is mounted for rotation in the chamber by means of the tubular shaft 57 to which the disc 51 is secured as by welding. The fiber-forming liquid is supplied to the chamber 54 through the tubular shaft 57 which communicates with a source of the liquid (not shown).

As compared to the fiber-forming units of FIGURES 1 and 5, this centrifugal unit does not require an independent and separate means for producing the air blast required in forming the fibers since the impeller may be driven from the same power source as the disc.

The spinning liquid is supplied under pressure to the chamber of the spinning disc and is extruded through the spray nozzles by the centrifugal force created within the disc as it rotates in addition to the supply pressure. As the fiber-forming liquid leaves the nozzle, it is subjected to this static extrusion pressure exerted in a radial direction. Simultaneously, the plastic stream is subjected to a tangential force. The directions of these forces which are at right angles to each other are continuously changing with the rotation of the disc. These forces are believed to effect at least a portion of the attenuation of the plastic stream. The outermost end of the plastic or fiber is in the air and the extruded plastic which is just emerging from the extrusion orifice is moving in a circular path with the extrusion orifice. The friction between the end of the fiber and the air is believed to cause a drag which may account for a part of the attenuation of the plastic stream. The air flow created by the impeller also subjects the fiber to a force which is at an angle to the plane of the extrusion and the tangential forces. As the free end of the fiber is blown upwardly, a further drag is probably created with respect to the movement of the nozzle. The combined forces and the frictional drag cause the attenuation and stretching of the fiber and the breaking of the attenuated plastic to form discontinuous fibers. During this period, the major portion of the solvent becomes volatilized to establish the size of the fibers.

It is to be understood that the filters of the invention may include various additive substances, such for example as a uniform dispersion of textile fibers of substantially uniform diameter. It has been found that the filter can be opened up and the back pressure reduced by adding to the fibrous mixture from 10 to 50% by weight of coarse textile fibers which may be taken from the class of natural or synthetic textile fibers such for example as cotton, wool, kapok, silk, ramie, rayon, acetate, nylon, Dacron, acrylic fibers and the like. The effect of the uniform addition of such uniform coarse fibers is to give the filter a more open structure.

The filter may also contain absorptive materials such, for example, as from 5% to 100% by weight of activated charcoal, silica gel, ion exchange resin particles and the like which are employed for selectively removing certain components from the fluid mixture to be filtered.

The fine fibers, that is, fibers having diameters less than the diameters of textile fibers; that is, fibers having diameters less than about 10 microns, cannot be handled by the ordinary textile equipment and by the customary textile methods. In attempting to handle these fine fibers by papermaking techniques, the fibers are reduced to short lengths which are not entirely satisfactory. Filter media formed of the fine fibers are highly desirable because of the extremely high filtration efficiencies attributed by the fine fibers. However, for many purposes, such filters are too highly effective and offer too high a resistance to fluid flow. It is not practical to utilize a series of filters formed of progressively smaller size fibers because of the high resistance to fluid flow.

By the present method, fine fibers are formed and are dispersed and collected in a controlled manner and are intermingled with and combined with coarse fibers to produce highly efficient filter media and yet not increase excessively the resistance to fluid flow. The intermingling of the fine and coarse fibers and the simultaneous collection of the different fibers in the completely random distribution prevents a dense packing of the fine fibers which would normally offer an excessively high resistance to fluid flow. By collecting the different fibers in the manner described, products may be prepared wherein the average fiber diameter varies progressively along a dimension of the filter from the diameter of one of the types of fibers to that of the other of the types of fibers. In addition to obtaining a high filtration efficiency, the web or mat may be readily subjected to a treatment, as by passing it between heated pressure rolls as illustrated in FIGURES 1 and 5, whereby the fine fibers bind all of the fibers into a cohesive mass without appreciably affecting the filtration efficiency.

The filters of the invention may be varied in size, fiber content and structure without transcending the scope of the invention. The filters of the invention are adapted for filtering air and gas mixtures of all kinds, water and aqueous solutions, oils and oil emulsions, organic solvent solutions and the like.

By way of illustrating but not by way of limiting the invention, there may be given the following example:

Using the apparatus shown in FIGURE 1, a fiber-forming liquid comprising 20% of a copolymer of vinyl chloride and vinyl acetate, known commercially as Vinyon VYHH, dissolved in a mixture of tetrahydrofuran and methyl ethyl ketone was sprayed into fibers by means of a spinning disc, as illustrated in FIGURE 7, mounted in a chamber as in FIGURE 1, to produce micro fibers having diameters of from about 0.5 micron to about 3 microns. Simultaneously, rayon staple fibers of 1.5 denier having diameters of about 12 microns, are blown into the chamber through a fiber distributing unit as unit 3 in FIGURE 1. The fine or micro fibers will be deposited primarily in the area A, the mixture of rayon and micro fibers in the area C and the coarse rayon fibers primarily in the area B but there will be a gradual transition in average fiber diameter from top to bottom of the web produced. When used as a filter for aqueous suspensions, the composite filter layer so produced showed a lower back pressure per unit of time and a greater delivery rate than a layer of the same thickness formed of 100% micro fibers having diameters of 0.5 to 3 microns. Although the composite filter layer showed a high back pressure and a lesser delivery rate than a layer of 100% of the rayon fibers (1.5 denier), the filtration efficiency of the composite layer was greatly superior to that of the all-rayon filter layers.

We claim:
1. As an article of manufacture, a fibrous filter body consisting essentially of coarse fibers and fine fibers, the average fiber diameter varying progressively along a dimension of the body from the diameter of the coarse fibers to the diameter of the fine fibers, the coarse fibers having a diameter exceeding 10 microns, the fine fibers having a diameter of from about 0.5 micron to 10 microns, the filter body having the property of filtration in depth.

2. As an article of manufacture, a filter comprising a foraminous, tubular support and a contiguous fibrous filter body consisting essentially of coarse fibers and fine fibers, the average fiber diameter varying progressively and radially in the filter body from the diameter of the coarse fibers to the diameter of the fine fibers, the coarse fibers having a diameter exceeding 10 microns, the fine fibers having a diameter of from about 0.5 micron to 10 microns, the filter body having the property of filtration in depth.

3. An article of manufacture as defined in claim 2 wherein the surface of the fibrous filter body having an average fiber diameter of that of the coarse fibers is in contact with the tubular support.

4. An article of manufacture as defined in claim 2 wherein the surface of the fibrous filter body having an average fiber diameter of that of the fine fibers is in contact with the tubular support.

References Cited by the Examiner

UNITED STATES PATENTS

| | | | |
|---|---|---|---|
| 2,148,708 | 2/1939 | Orr | 210—505 XR |
| 2,288,426 | 6/1942 | Stack | 210—505 XR |
| 2,316,721 | 4/1943 | Schwartz | 210—477 XR |
| 2,546,230 | 3/1951 | Modigliani | 55—527 |
| 2,570,184 | 10/1951 | Abbott | 19—.6 |
| 2,796,950 | 6/1957 | Hersey | 55—527 |
| 2,908,043 | 10/1959 | Whitney | 19—.6 |
| 3,044,957 | 7/1962 | Dow et al. | 210—508 |
| 3,116,245 | 12/1963 | McNabb et al. | 210—508 |

JULIUS GREENWALD, *Primary Examiner.*